(12) United States Patent
Yang et al.

(10) Patent No.: US 7,135,545 B2
(45) Date of Patent: Nov. 14, 2006

(54) HIGH MOLECULAR WEIGHT LENSES FORMED FROM VISCOSITY-SPECIFIC POLYCARBONATE

(75) Inventors: Hsinjin Edwin Yang, Palm Harbor, FL (US); Hao Wen Chiu, Palm Harbor, FL (US)

(73) Assignee: Essilor International Compagnie General D'Optique (FR)

( * ) Notice: Subject to any disclaimer, the term of this patent is extended or adjusted under 35 U.S.C. 154(b) by 173 days.

(21) Appl. No.: 10/835,433

(22) Filed: Apr. 29, 2004

(65) Prior Publication Data

US 2005/0245720 A1    Nov. 3, 2005

(51) Int. Cl.
*C08F 6/00*    (2006.01)
(52) U.S. Cl. .................. 528/480; 264/176.1; 264/219; 359/642; 528/480
(58) Field of Classification Search ............. 264/176.1, 264/219; 359/642; 528/480
See application file for complete search history.

(56) References Cited

U.S. PATENT DOCUMENTS

| | | | |
|---|---|---|---|
| 4,699,745 A | 10/1987 | Fritsch et al. | |
| 5,212,280 A | 5/1993 | Serini et al. | |
| 5,316,791 A | 5/1994 | Farber et al. | |
| 6,613,869 B1 | 9/2003 | Horn et al. | |

FOREIGN PATENT DOCUMENTS

| | | |
|---|---|---|
| EP | 0 614-957 | 9/1994 |
| JP | S60-23421 | 2/1985 |
| WO | WO 95/14742 | 6/1995 |

OTHER PUBLICATIONS

Bayer Corporation, Plastics Division, A processing guide for Injection Moldiing, 1995, p. 1-56, Pittsburgh, PA.
Bayer Corporation, Bayer Plastics Tech Center, Speciality grades/Blow molding Datasheet, http://plastics.bayer.de/BC/AE/products/types/datasheet.jsp?=ISO&grade_id=242&pid=1, 2001, 5 pages.
D.J. Brunelle, G. Kailasam, Polycarbonates, GE Research & Development Center, Technical Information Series, Feb. 2002, pp. 1-32.

*Primary Examiner*—Terressa Boykin
(74) *Attorney, Agent, or Firm*—Keusey, Tutunjian & Bitetto, P.C.

(57) ABSTRACT

Methods are disclosed which utilize polycarbonate to form solid optical lenses. The polycarbonates may be selected from high molecular weight linear or branched species. Viscosity and melt flow are specified for improved mechanical properties. The method provides lenses with greater resistance to cracking and crazing, for example, in instances where flaws are subject to strain and require containment.

21 Claims, 3 Drawing Sheets

HIGH MOLECULAR WEIGHT LENSES FORMED FROM VISCOSITY-SPECIFIC POLYCARBONATE

BACKGROUND OF THE INVENTION

1. Field of the Invention

The present invention relates to a method for forming a lens from a high molecular weight, viscosity-specific polycarbonate having improved mechanical properties.

2. Description of the Related Art

Lenses and other articles manufactured at optical quality, have exacting demands for mold replication, high optical transmission and impact resistance. In the 2002 Polycarbonates publication, Brunelle and Kailasam describe how polycarbonate is prepared by the transesterification of a bisphenol-A with a carbonate. They explain how lower molecular weights provide a good balance between desirable mechanical properties and processability of the resin.

U.S. Pat. No. 5,212,280 describes diphenols which are useful in the condensation method of producing polycarbonate in the presence of phosgene. WO 95/14742 describes a carbonate blend polymer containing a low molecular weight component to improve processability. U.S. Pat. No. 4,699,745 describes a stretching ratio just prior to the granulation process for improving tensile strength in the resulting product. JP 60-23421 describes controlling operation of the molding machine to reduce distortions in large and thin articles. U.S. Pat. No. 6,613,869 addresses the molding of large and thin articles by specifying one of two blow molding techniques to make water bottles.

As the above survey indicates, many attempts have been made to chemically engineer low molecular weight resins for improved performance in injection molding applications. Furthermore, the high molecular weight resins have been relegated to blow molding and extrusion type processes which are not suitable for manufacturing solid articles requiring exacting mold replication. In general, the chemistry of a resin, including polymer type, nature of branching agents and presence of additives, dictated the available product-forming techniques. Accordingly, it would be desirable to injection mold optical lenses from high molecular weight, viscosity-specific polycarbonate, to obtain better mechanical properties, previously associated with extruded or blow-molded products only.

SUMMARY OF THE INVENTION

It is an object of the present invention to provide high molecular weight solid articles in the form of optical lenses having a specified viscosity range.

It is a further object of the invention to impart improved mechanical properties to the lenses to contain flaws occurring within the articles.

These and other related objects are achieved according to the invention by a method for reducing the initiation and propagation of flaws in solid polycarbonate articles including the steps of providing a high molecular weight (HMW) polycarbonate (PC) having a viscosity of at least 650 Pa·s at a shear rate of 100 s$^{-1}$. The PC is used to form a highly transmissive optical lens by common lens shaping techniques, wherein the forming step renders an HMW optical surface from a lens shaping operation having greater resistance to stress induced cracking and crazing. Of interest are HMW polycarbonates having a viscosity between 1000 and about 1100 Pa·s at a shear rate of 100 s$^{-1}$ at 299 degrees C. The polycarbonates have a melt flow between 0.1 and 6.0 g/10 min. at 300 degrees C., and more specifically between about 2.0 g/10 min. and about 4.0 g/10 min. at 300 degrees C.

The HMW polycarbonate has a weight average molecular weight ($M_w$), as determined by gel-permeation chromatography (GPC) using polystyrene and polycarbonate standards, in the range of 27,000 to 40,000, which exceeds $M_w$ values for regular ophthalmic grade polycarbonate. Of interest are HMW polycarbonates having a $M_w$ in the range of 28,000 to 33,000. The HMW polycarbonate has also a z-average $M_z$, as determined by gel-permeation chromatography (GPC) using polystyrene and polycarbonate standards, in the range of 39,000 to 62,000. Of interest are HMW polycarbonates having a $M_z$ in the range of 42,000 to 51,000. Then in the present application a high $M_w$ combined with a high $M_z$ is an essential characteristic of the invention.

Those polycarbonates meeting the above requirements may include both linear polycarbonates and branched polycarbonates. The branched polycarbonates may include branching agents having three or more phenolic groups or three or more carboxylic groups, for example 1,1,1-tris(4-hydroxyphenyl)ethane and 3,3-bis(3-methyl-4-hydroxyphenyl)-2-oxo-2,3-dihydroindole.

The HMW polycarbonate may be subject to non-blown processing steps prior to the lens shaping operation. In the present application, it is understood that lens shaping means any forming methods to form a lens, e.g. injection molding, compression molding, thermoforming, free forming, extrusion, and other suitable processes except lens shaping needing a blown molding step. The combination of high viscosity at the stated shear rate, high melt flow, and $M_w$ along with the $M_z$ and the $M_z/M_w$ ratio renders an HMW optical surface formed from a final lens shaping operation having greater resistance to stress induced cracking and crazing.

In practical applications of eyewear, the lens may be optionally tinted and coated with at least one protective layer. Holes may be drilled through the coating and the optical lens to form a bore bordered by a side wall. The combination of viscosity at the stated shear rate and $M_w$ along with $M_z$ and the $M_z/M_w$ ratio renders an HMW side wall having greater resistance to stress induced cracking and crazing. Finally, the combination of viscosity at the stated shear rate, high melt flow and $M_w$ along with the $M_z$ and the $M_z/M_w$ ratio renders an HMW side wall with improved containment of flaws created in the polycarbonate during drilling so that the flaws are less likely to cause cracking and crazing in the protective coating layer.

BRIEF DESCRIPTION OF THE DRAWINGS

The advantages, nature, and various additional features of the invention will appear more fully upon consideration of the illustrative embodiments now to be described in detail in connection with accompanying drawings. In the drawings wherein like reference numerals denote similar components throughout the views.

DETAILED DESCRIPTION OF PREFERRED EMBODIMENTS

The present invention provides methods for forming lenses with enhanced mechanical properties by lens shaping resins which heretofore have been chemically engineered for, and used exclusively in, different processing methodologies. The Polycarbonates publication succinctly explains why the prior art teaches away from the novel approach presented in the instant application. The mechanical properties of polycarbonate improve as intrinsic viscosity increases, up to a point. Beyond that point, the marginal improvement, resulting from increasing molecular weight, is outweighed by the concurrently increasing melt viscosity which threatens processability. As the relationships between viscosity, shear rate, molecular weight and melt flow are described below, their effect on forming lenses will become more apparent.

Figure 1:
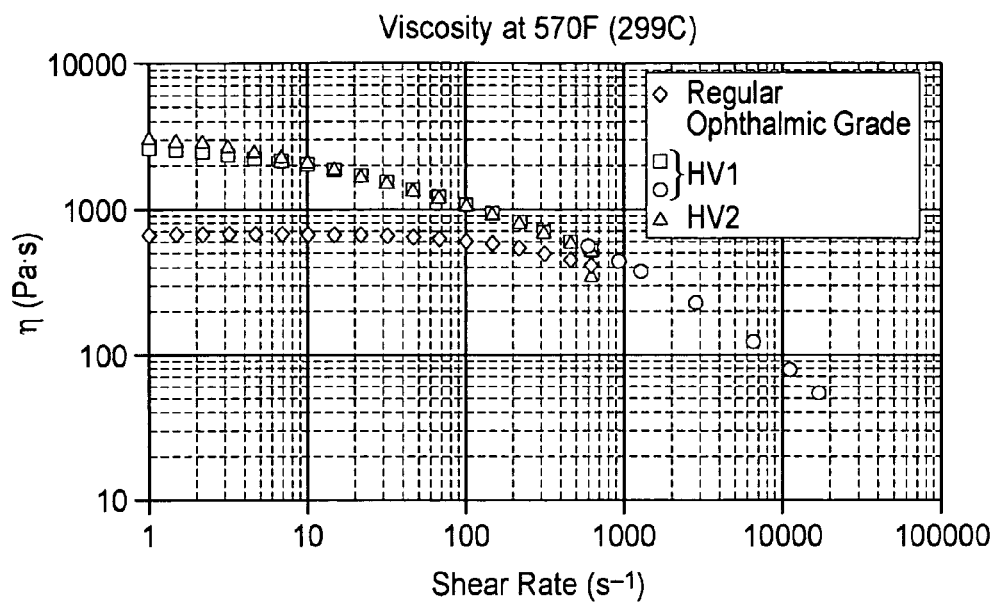
FIG. 1 is graph comparing the viscosity of HV resins compared to regular ophthalmic grade resins.

Viscosity and Shear Rate. Viscosity ($\eta$) is measured in Pascals X seconds (Pa·s) and is displayed on a log scale, with the values around 1000 being of greatest significance. This is plotted as a function of shear rate ($\gamma$) measured in units per second ($s^{-1}$), also displayed on a log scale with values up to about 1000 being of interest. The plot for values upto 1000 shear rate is obtained from the plate & plate rheometer at 299 degrees C. Values above 600 shear rate, designated by the circles, are obtained from a capillary test. As can be seen in the graph of FIG. 1, there is a curve of standard injection molding regular ophthalmic grade polycarbonate on the bottom in contrast with a curve of high viscosity, blow molding grade polycarbonate on the top. These are designated as HV1 and HV2. Representative values from the graph are presented in the following Table 1.

TABLE 1

Viscosity Values of Various Polycarbonate Grades

| Shear Rate ($s^{-1}$) | Regular Ophthalmic Grade - Viscosity (Pa · s) | HV1 - Viscosity (Pa · s) | HV2 - Viscosity (Pa · s) |
| --- | --- | --- | --- |
| 624 | 400 | 510 | 494 |
| 100 | 599 | 1068 | 1056 |
| 21 | 663 | 1685 | 1739 |
| 10 | 673 | 2004 | 2138 |
| 2 | 680 | 2520 | 2877 |
| 1 | 679 | 2667 | 3082 |

The representative values for viscosity are applicable to both linear and branched polymer resins. Viscosity is dependent on polymer structure including polymer chain length and degree of branching. So higher viscosity resins having longer polymer chains or a higher degree of branching or a combination contribute to their resistance to flow. For branched resins, possible branching agents include branching agents having three or more phenolic groups or branching agents having three or more carboxylic groups, i.e. tri- or tetrafunctional phenols or carboxylic acids. An exemplary listing includes the following:

phloroglucinol;
4,6-dimethyl-2,4,6-tri-(4-hydroxyphenyl)-2-heptene;
4,6-dimethyl-2,4,6-tri-(4-hydroxyphenyl)-heptane;
1,3,5-tri-(4-hydroxyphenyl)benzene;
1,1,1-tris(4-hydroxyphenyl)ethane;
tri-(4-hydroxyphenyl)phenylmethane;
2,2-bis[4,4-bis(4-hydroxyphenyl)cyclohexyl]propane;
2,4-bis(4-hydroxyphenylisopropyl)phenol;
2,6-bis(2-hydroxy-5'-methylbenzyl)-4-methylphenol;
2-(4-hydroxyphenyl)-2-(2,4-dihydroxyphenyl)propane;
hexa-[4-(4-hydroxyphenylisopropyl)phenyl]terphtalic acid ester;
tetra-(4-hydrophenyl)methane;
tetra-[4-(4-hydroxyphenylisopropyl)phenoxy]methane;
1,4-bis(4',4"-dihydroxytriphenyl)methylbenzene;
2,4-dihydroxybenzoic acid;
trimesic acid;
cyanuric chloride;
3,3-bis(3-methyl-4-hydroxyphenyl)-2-oxo-2,3-dihydroindole;
trimesic acid trichloride;
$\alpha,\alpha',\alpha''$-tris(4-hydroxyphenol)1,3,5-triisopropylbenzene;
and combinations thereof.

The preferred branching agents are 1,1,1-tris(4-hydroxyphenyl)ethane and 3,3-bis(3-methyl-4-hydroxyphenyl)-2-oxo-2,3-dihydroindole.

Of key significance is that the suppliers of injection molding regular ophthalmic grade resin designate it as low viscosity or medium viscosity. For example, the Bayer Makrolon Polycarbonate Injection Molding Processing Guide on page 6 specifies five grades including the 2200 series of very low viscosity, the 2400 series of low viscosity, the 2600 series of medium viscosity, the 2800 series of medium-low viscosity and the 3100 series of medium-high viscosity. By contrast, the manufacturer's specification for the 1200 series high viscosity resin is a branched polymer designated for blow molding, injection stretch blow molding and extrusion blow molding.

The relationship between molecular weight and viscosity explains why HV resins are specified for blow molding. The rheological properties of branched resins are different from those of linear resins. The branched resins demonstrate non-Newtonian behaviour, and viscosity depends more on shear rate than temperature. The melt viscosity of branched resins decreases with increasing shear rate, allowing extrusion at lower temperatures for blow molding applications.

Molecular Weight. As used herein, molecular weight means, weight-average molecular weight, designated by $M_w$ and z-average designated by $M_z$ and obtained by GPC (Gel Permeation Chromatography) technique.

$M_w$ and $M_z$ relationship: The processing behavior and many end-use properties of polymers are influenced not only by the average molecular weight but also by the width and the shape of the molecular weight distribution (MWD). A MWD is reasonably characterized when at least three different molecular weights, the number average $M_n$, the weight average $M_w$ and the z-average $M_z$, are known. Some properties of polymers, including tensile and impact strength, are specifically governed by the short molecules ($M_n$ being important); for other properties, like solution viscosity and low shear melt flow, the influence of the middle class of the chains is predominant ($M_w$ being important); yet other properties, such as melt elasticity, are highly dependent on the amount of the longest chains present ($M_z$ being important).

The molecular weight averages are defined as follows:

$$\overline{M}_n = \frac{\sum N_i M_i}{\sum N_i} = \frac{W}{N}$$

-continued $$\overline{M}_w = \frac{\sum N_i M_i^2}{\sum N_i M_i} = \sum w_i M_i$$

$$\overline{M}_z = \frac{\sum N_i M_i^3}{\sum N_i M_i^2} = \frac{\sum w_i M_i^2}{\sum w_i M_i}$$

where $N_i$=number of molecules of molecular weight $M_i$
N=total number of molecules
$W_i$=weight fraction of molecules of molecular weight $M_i$
W=total weight
Characteristic ratios are $$\text{Dispersity} = Q = \frac{\overline{M}_w}{\overline{M}_n} \text{ and } Q' = \frac{\overline{M}_z}{\overline{M}_w}.$$

Q=Q'=1 would correspond to a perfectly uniform or monodisperse polymer. A high Q-ratio points to a low-molecular-weight tail, whereas a high Q'-ratio indicates the presence of very high-molecular-weight material.

To conduct the molecular weight measurement, a sample solution was first prepared by dissolving 12 mg of polycarbonate into 4 mL of THF (tetrahydrofuran) such that the concentration of polycarbonate was about 0.30%. THF stabilized with less than 0.025% butylated hydroxytoluene was used as eluent. Using a "Waters 590" pump and a "Waters 717+WISP" injector, 150 µL of the polycarbonate sample solution was injected, at a flow rate of 0.85 mL/minute, into columns packed with gel of varying pore size. The columns were "Waters Styragel HR5 7.8×300 mm WAT85504", "Waters Styragel HR4 7.8×300 mm WAT10573", "Waters Styragel HR3 7.8×300 mm WAT044223", and "Waters Styragel HR2 7.8×300 mm WAT044227" in series. Two detectors including a "Waters 486UV @265 nm" and a "Waters 410RI @16×" were used to detect the emerging molecules. The whole GPC analysis process was performed at a temperature of 35° C. Ten polystyrenes (162 Mp–109000 Mp) and one 22 k polycarbonate were used as calibration standards for computing the molecular weight of the sample being tested.

References to high molecular weight (HMW) resins mean:
- firstly $M_w$ above about 27,000. Generally the range is from about 27,000 upto about 40,000. More particularly, good results can be obtained with $M_w$ in the range from about 28,000 to about 33,000. References to low molecular weight resins mean $M_w$ below 27,000.
- secondly $M_z$ which is in the range from about 39,000 up to about 62,000. More particularly good results can be obtained with $M_z$ in the range from about 42,000 to about 51,000.

Melt Flow. Melt flow (m.f.) is described in units of grams of flow per 10 minutes at 300 degrees C and is measured with 1.2 kg total load, 0.0825" orifice (ASTM D1238 and ISO 1133). Generally, the resins identified above have a melt flow in the range of 0.1 to 6.0 g/10 min. Good results have been obtained from resins having a melt flow in the range of about 2.0 g/10 min. to about 4.0 g/10 min.

Note how the manufacturers exactly correlate melt flow to the viscosity categories mentioned above. In this case higher m.f. is analogous to lower viscosity. For example, the Bayer Makrolon Polycarbonate Injection Molding Processing Guide on page 6 specifies five grades including the 2200 series of 38 g/10 min., the 2400 series of 20 g/10 min., the 2600 series of 13 g/10 min., the 2800 series of 10 g/10 min. and the 3100 series of 6.5 g/10 min. By contrast, the manufacturer's specification for the 1200 series resin has a melt flow value of 3.0 and is designated for blow molding, injection stretch blow molding and extrusion blow molding.

TEST RESULTS

Screw Hole Strain Test: A Strain Ring Test was conducted on 2 mm thick plano lenses, made from regular ophthalmic grade PC as well as HV2 PC. One set of control lenses was uncoated, a second set was coated with a hard coating, for example by a primer coating as described in the U.S. Pat. No. 5,316,791 combined with a hard-coating as described in the example 3 of the patent EP 0 614 957 brand hard coating, and a third set was coated with a hard coating followed by and antireflection (AR) coating, for example Cryzal® brand AR. After 4 days of testing on a drill hole, the second and third set of regular ophthalmic grade lenses developed severe cracking and crazing radiating out from the edge of the hole. The third set of HV2 lenses did not develop any noticeable cracking or crazing, even after 6 days of Screw Hole Strain Test testing.

Flexure Test. Bars having a dog-bone shape were injection molded from regular ophthalmic grade resin and the HV1 and HV2 resins. The central part, which straddled two fixed, frame members of the Instron test bench, was about 13 mm wide and about 7 mm thick. In the middle of the bar a 4 mm hole was drilled and engaged with a #6-32 socket head cap screw and nut, subject to a constant strain of two screw turns. Six samples each, for a total of 18 samples were left undisturbed at room temperature for at least 12 hours. The samples were then annealed in an oven for 4 hours at 120 degrees C. During the test the load was imposed on the head of the screw.

Figure 2:
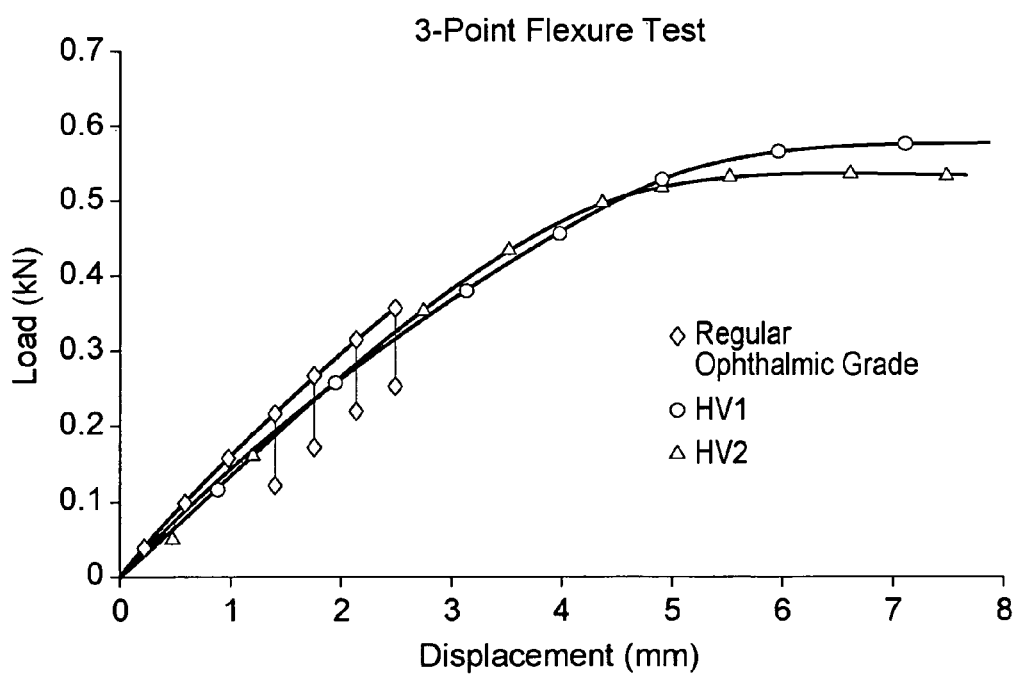
FIG. 2 is a graph comparing flexure testing between HV resins and regular ophthalmic grade resins.

FIG. 2 is a composite graph illustrating all 18 curves. The low viscosity, low $M_w$ regular ophthalmic grade, represented by the diamond, experienced 6 out of 6 failures between about 0.25 and 0.35 kN. All 6 of 6 of the high viscosity, high $M_w$ samples HV1, represented by the circle, demonstrated superior mechanical properties by resisting the full load of about 0.6 kN. All 6 of 6 of the high viscosity, high $M_w$ samples HV2, represented by the triangle, also demonstrated superior mechanical properties by resisting the full load of about 0.6 kN.

Fatigue Test. A 3-point fatigue test was carried out on 4 mm thick plano lenses edged down to 30 mm by 60 mm dimensions. A 4 mm round hole was drilled through the center of regular ophthalmic grade and HV2 samples. A screw/nut assembly was installed, and the samples were mounted onto the Instron under similar conditions as the flexure test.

The test was performed with a 2.5 mm bending displacement. Bending velocities of 150 mm/minute and 300 mm/minute corresponding to 0.5 Hz and 1.0 Hz, respectively, were adopted. All of the regular ophthalmic grade samples showed visible cracks by 2,000 fatigue cycles. By 4,000 fatigue cycles, the regular ophthalmic grade samples had severe cracks with sample failures occurring around 5,000 cycles. The HV2 samples had no signs of visible cracks by 8,000 fatigue cycles. Small cracks did begin to appear at around 10,000 cycles. Surprisingly, the moderate differences in viscosity, melt flow and molecular weight resulted in at least a 5-fold improvement in duration under the fatigue test. In addition, the high performance level of the HV2 persisted independent of the bending frequency.

Figure 3:
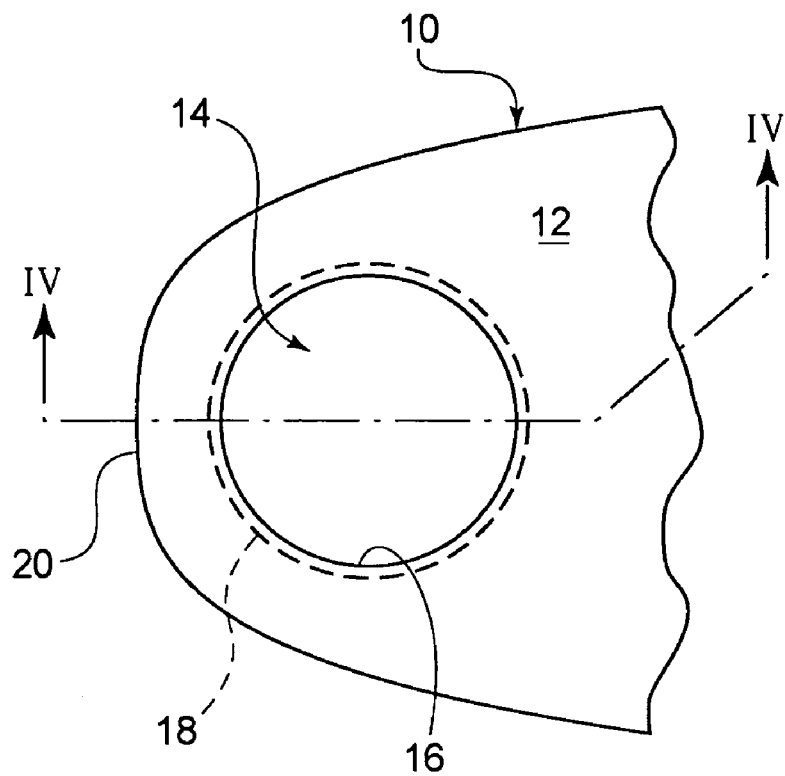
FIG. 3 is a schematic, top plan view of an optical lens.
Figure 4:
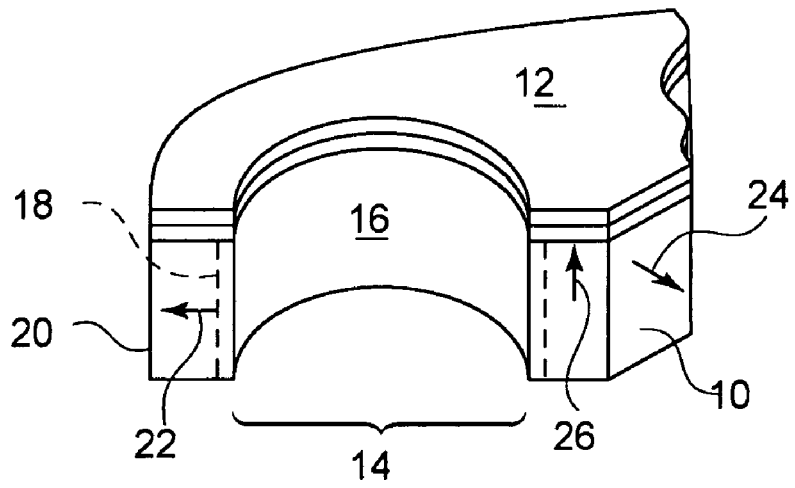
FIG. 4 is a cross-section view taken along the line IV—IV from FIG. 3.

FIGS. 3 and 4 schematically illustrate a solid body, compression molded lens 10 having one or more coating layers 12. Drilling off-center, near lens edge 20 creates a bore 14 having a side wall 16. A cylindrical zone 18 indicates a region containing microscopic flaws resulting from the drilling process. These flaws start out as cosmetically and mechanically benign, but can adversely affect the use of the spectacle in three ways. First, flaws can propagate radially from zone 18 in a direction 22 to create cracks extending toward lens edge 20. Second, flaws can extend into solid body 10 as represented by arrow 24. Third, flaws can propagate axially in a direction 26 to cause cracking and crazing in coating layers 12.

Figure 5:
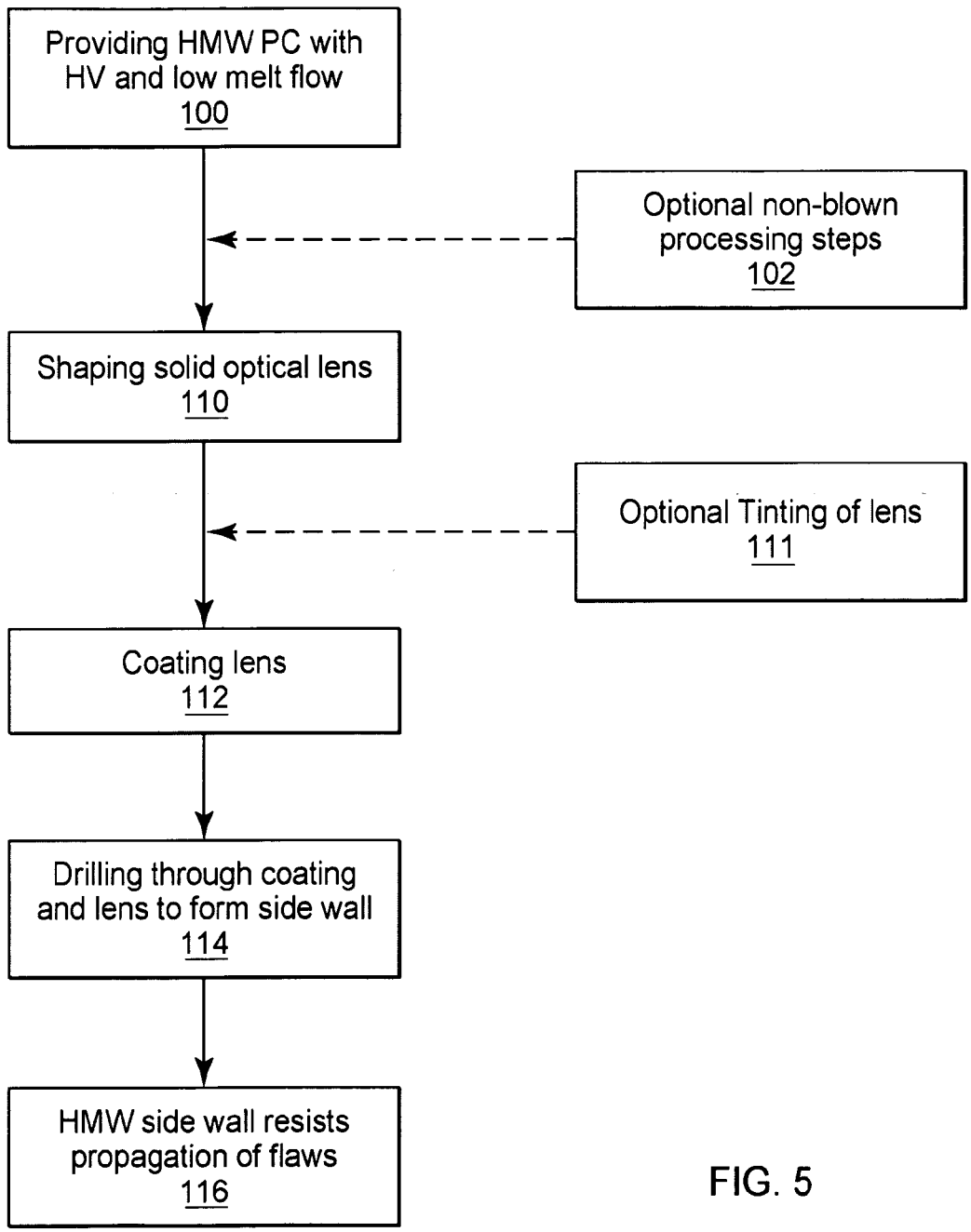
FIG. 5 is a flow chart describing method steps for processing HMV, viscosity-specific PC according to the invention.

As shown in FIG. 5, initially, a HMW PC with HV and low melt flow is provided in step 100. Optional non-blown processing steps may occur in step 102, i.e. processes which do not include blow molding in any form or steps. The final forming step 110 consists of shaping a solid body to form an optical lens, for example by injection molding, compression molding, thermoforming, free forming or other suitable processes. Optional tinting of the lens occurs in step 111. The lens is coated in step 112. The off-center bore 14 is formed in step 114 by drilling through the coating and the lens. Finally, in step 116, the newly created HMW side wall 16 is formed that resists the propagation of flaws created in zone 18 during drilling step 114.

The above-noted battery of tests was designed to predict durability in actual spectacle lenses, the significance of which will be explained in connection with the following practical examples. Even minor increases in desirable mechanical properties are of significant importance considering the growing trend of rimless spectacles, where the nose bridge and stems are mounted to the lenses with screws that pass through bores 14 that are located near lens edge 20. The containment of flaws from extending in radial direction 22 and reaching edge 20, is quantified by the flexure test. In other word, the methods of the invention provide significantly improved flaw containment, with respect to radial propagation in direction 22. This in turn, limits rimless mount failure, characterized by cracks or cracked portions between 16 and 20.

The containment of flaws within the solid body, represented by arrow 24, is quantified by the fatigue test. Accordingly, the methods of the invention provide significantly improved endurance to fatigue cycling within the solid body.

The containment of flaws from extending in axial direction 22 and reaching coating layers 12, is quantified by the Screw Hole Strain Test. In other word, the methods of the invention provide significantly improved flaw containment, with respect to propagation in axial direction 22. This in turn, limits cosmetic defects, characterized by cracking and crazing in the coating emanating from zone 18.

Having described preferred embodiments for lens manufacturing, materials used therein and methods for processing same (which are intended to be illustrative and not limiting), it is noted that modifications and variations can be made by persons skilled in the art in light of the above teachings. It is therefore to be understood that changes may be made in the particular embodiments of the invention disclosed which are within the scope and spirit of the invention as outlined by the appended claims. Having thus described the invention with the details and particularity required by the patent laws, what is claimed and desired protected by Letters Patent is set forth in the appended claims.

What is claimed is:

1. A method of forming high molecular weight (HMW) polycarbonate (PC) into an optical lens in the absence of any blow molding operations, wherein the resulting lens exhibits a reduction in the initiation and propagation of flaws, comprising the steps of:
    providing a high molecular weight (HMW) polycarbonate (PC) having a viscosity of at least 650 Pa·s at a shear rate of 100 s$^{-1}$; and
    forming a highly transmissive optical lens from the PC by lens shaping,
    wherein said forming step renders an HMW optical surface from a lens shaping operation having greater resistance to stress induced cracking and crazing.

2. The method of claim 1, wherein the HMW polycarbonate has a viscosity between 1000 Pa·s and about 1100 Pa·s at a shear rate of 100 s$^{-1}$ at 299 degrees C.

3. The method of claim 1, wherein the polycarbonate has a melt flow between 0.1 and 6.0 g/10 min. at 300 degrees C.

4. The method of claim 1, wherein the polycarbonate has a melt flow between about 2.0 g/10 min. and about 4.0 g/10 min. at 300 degrees C.

5. The method of claim 1, wherein the HMW polycarbonate has a weight average molecular weight ($M_w$), as determined by gel-permeation chromatography (GPC) using polystyrene and polycarbonate standards, in the range of 27,000 to 40,000, which exceeds $M_w$ values for regular ophthalmic grade polycarbonate.

6. The method of claim 5, wherein the HMW polycarbonate has a $M_w$ in the range of 28,000 to 33,000.

7. The method of claim 1, wherein the HMW polycarbonate also has a z-average ($M_z$), as determined by gel-permeation chromatography (GPC) using polystyrene and polycarbonate standards, in the range of 39,000 to 62,000.

8. The method of claim 7, wherein the HMW polycarbonate has a $M_z$ in the range of 42,000 to 51,000.

9. The method of claim 1, wherein the HMW polycarbonate includes linear polycarbonate.

10. The method of claim 1, wherein the HMW polycarbonate includes branched polycarbonate.

11. The method of claim 10, wherein the branched polycarbonate includes branching agents having three phenolic groups.

12. The method of claim 10, wherein the branched polycarbonate includes branching agents having three carboxylic groups.

13. The method of claim 10, wherein the branched polycarbonate includes branching agents selected from the group consisting of:
    phloroglucinol;
    4,6-dimethyl-2,4,6-tri-(4-hydroxyphenyl)-2-heptene;
    4,6-dimethyl-2,4,6-tri-(4-hydroxyphenyl)-heptane;
    1,3,5-tri-(4-hydroxyphenyl)benzene;
    1,1,1-tris(4-hydroxyphenyl)ethane;
    tri-(4-hydroxyphenyl)phenylmethane;
    2,2-bis[4,4-bis(4-hydroxyphenyl)cyclohexyl]propane;
    2,4-bis(4-hydroxyphenylisopropyl)phenol;
    2,6-bis(2-hydroxy-5'-methylbenzyl)-4-methylphenol;
    2-(4-hydroxyphenyl)-2-(2,4-dihydroxyphenyl)propane;
    hexa-[4-(4-hydroxyphenylisopropyl)phenyl]terphtalic acid ester;
    tetra-(4-hydrophenyl)methane;
    tetra-[4-(4-hydroxyphenylisopropyl)phenoxy]methane;
    1,4-bis(4',4''-dihydroxytriphenyl)methylbenzene;
    2,4-dihydroxybenzoic acid;
    trimesic acid;
    cyanuric chloride;

3,3-bis(3-methyl-4-hydroxyphenyl)-2-oxo-2,3-dihydroindole;

trimesic acid trichloride;

α,α',α"-tris(4-hydroxyphenol) 1,3,5-triisopropylbenzene, and combinations thereof.

14. The method of claim 10, wherein the branched polycarbonates include branching agents selected from the group consisting of:

1,1,1-tris(4-hydroxyphenyl)ethane; and 3,3-bis(3-methyl-4-hydroxyphenyl)-2-oxo-2,3-dihydroindole.

15. The method of claim 2, wherein said providing step further comprises providing a polycarbonate having a melt flow between about 2.0 g/10 min. and about 4.0 g/10 min. at 300 degrees C. and wherein the HMW polycarbonate has a higher weight average molecular weight ($M_w$) and a higher z-average ($M_z$) than regular ophthalmic grade polycarbonate as determined by gel-permeation chromatography (GPC) using polystyrene and polycarbonate standards, wherein the HMW polycarbonate has a $M_w$ in the range of 28,000 to 33,000 and wherein the HMW polycarbonate also has a $M_z$ in the range of 42,000 to 51,000.

16. The method of claim 1, wherein the lens shaping operation is one of injection molding, compression molding, thermoforming, free forming, and extrusion.

17. The method of claim 1, wherein the combination of viscosity at the stated shear rate and $M_w$ along with the $M_z$ renders an HMW optical surface formed from a final lens shaping operation having greater resistance to stress induced cracking and crazing.

18. The method of claim 1, further including the steps of:

coating the lens with at least one protective layer; and drilling through the coating and the optical lens to form a bore bordered by a side wall.

19. The method of claim 18, wherein the combination of viscosity at the stated shear rate and $M_w$ along with the $M_z$ renders an HMW side wall having greater resistance to stress induced cracking and crazing.

20. The method of claim 18, further comprising the step of:

tinting the lens, prior to said coating step.

21. The method of claim 18, wherein the combination of viscosity at the stated shear rate and $M_w$ along with the $M_z$ renders an HMW side wall with improved containment of flaws created in the polycarbonate during drilling so that the flaws are less likely to cause cracking and crazing in the protective coating layer.

* * * * *